United States Patent Office 3,278,467
Patented Oct. 11, 1966

3,278,467
AQUEOUS DISPERSIONS OF HYDROUS HALO-
GENATED INTERPOLYMER MATERIAL AND
USES THEREOF
Oliver W. Burke, Jr., Fort Lauderdale, Fla. (1510 SW.
13th Court, P.O. Box 1266, Pompano Beach, Fla.), and
Oscar M. Grace, Madison Heights, Mich.; said Grace
assignor to said Burke
9 Claims. (Cl. 260—3.5)

This application is a continuation-in-part of U.S. application Serial No. 853,019, filed November 16, 1959, now abandoned.

This invention relates to the methods of preparing hydrous halogenated isoolefin-multiolefin interpolymer aqueous dispersions and the products obtained therefrom, the concentrating thereof and the compounding of these and with certain other materials and the vulcanizable composition thereof.

The present invention is more particularly concerned with the processes and certain products therefrom and such processes include: (1) the hydrous halogenation of isoolefin-multiolefin interpolymers aqueous dispersions whereby hydroxyl groups and halogen groups (halohydrin groups) are introduced into said interpolymer; (2) the aqueous dispersion of an issolefin-multiolefin interpolymer together with diluent and the removal of at least a part of such diluent from such aqueous dispersion and the subsequent hydrous halogenation thereof; (3) the formation of an isoolefin-multiolefin interpolymer in a diluent at a temperature below —100° F. and with the aid of a Friedel-Crafts catalyst and the emulsification thereof with the aid of a cationic and/or non-ionic emulsifier and preferably with the removal of at least a part of such diluent and the subsequent hydrous halogenation thereof.

The invention is further concerned with the process of concentrating the said hydrous halogenated isoolefin-multiolefin interpolymer aqueous dispersion, especially with the aid of hydrophilic polymeric creaming agent to form concentrated aqueous dispersions of said hydrous halogenated interpolymer (with polymer solids content of 40 to 60 percent by weight or higher) and with the concentrated hydrous halogenated interpolymer aqueous dispersions produced thereby.

This invention is further concerned with compositions comprising said hydrous halogenated isoolefin-multiolefin interpolymer in aqueous dispersion (with or without concentration) together with one or more materials selected from the class of vulcanization aids for said hydrous halogenated interpolymer including the aqueous solutions, emulsions, dispersions or suspensions of such including phenoplasts including halogenated phenolplasts, aminoplasts including halogenated aminoplasts and halogenated polymers consisting of halogenated polymers from conjugated dienes, halogenated polymers from conjugated dienes and vinyls and halogenated natural rubber with or without the addition of aqueous dispersions of other elastomers and/or plastomers, and with or without the addition of aqueous dispersions of compounding ingredients and from such dispersion compositions water can be removed to form vulcanizable compositions and vulcanizing the same to form vulcanizates.

The isoolefin-multiolefin interpolymer which are hydrous halogenated according to this invention and employed in the processes hereof include those known as "butyl rubbers" which are vulcanizable elastic interpolymers of isobutylene and small amounts of a diolefin such as isoprene (for further information regarding butyl rubber and its manufacture see R. J. Adams' and E. J. Buckler's article entitled "Evolution and Application of Butyl" in the Transactions of the Institute of Rubber Industry, vol. 29, No. 1, February 1953, pages 17–31) and such interpolymers have been described in U.S. Patents 2,322,073; 2,356,128; 2,356,129; 2,356,130; 2,373,706; 2,384,975; 2,418,913 and others.

STATE OF THE ART

The present invention of hydrous halogenation of isoolefin-multiolefin interpolymers is clearly distinguishable from the prior art halogenation of isoolefin-multiolefin interpolymers.

The anhydrous halogenation of isoolefin-multiolefin interpolymers with or without solvent is known to the patent art and set forth in U.S. Patents 2,631,984; 2,698,-041; 2,720,479; 2,732,354; 2,804,448; 2,809,372; 2,816,-098; 2,865,901; 2,857,357; and this invention teaches that aqueous dispersions of isoolefin-multiolefin interpolymers can be hydrous halogenated, that is, such interpolymers can be hypohalogenated in the presence of the aqueous phase. The hydrous halogenation of this invention yields interpolymer products having not only halogen groups but also having hydroxyl groups, whereas the anhydrous halogenation or halogenation in the presence of water of interpolymers according to the prior patent art yields products having predominately halogen groups.

OBJECTS OF THE INVENTION

The objects of the invention are as follows: (1) to provide a process for the production of hydrous halogenated isoolefin-multiolefin interpolymers aqueous dispersion; (2) to provide a process for the production of hydrous halogenated interpolymers which can be used in connection with the commercial methods of manufacturing butyl rubber; (3) to provide a process for the concentration of hydrous halogenated isoolefin-multiolefin interpolymers aqueous dispersions with the aid of a hydrophilic polymeric creaming agent; (4) to provide aqueous dispersions of hydrous halogenated isoolefin-multiolefin interpolymers especially concentrated aqueous dispersions of such hydrous halogenated interpolymers in which said interpolymer content exceeds 50% by weight; (5) to provide an aqueous dispersion composition containing said hydrous halogenated isoolefin-multiolefin interpolymers aqueous dispersion together with one or more vulcanization aids from the class thereof consisting of aqueous solutions, dispersions or suspensions of phenoplasts including halogenated phenoplasts, aminoplasts including halogenated aminoplasts, and halogenated polymers consisting of halogenated polymers from conjugated dienes, halogenated polymers from conjugated dienes and vinyls and halogenated natural rubber, and combinations of these with vulcanization aids and to provide vulcanizates thereof. Other objects of this invention will become apparent from the description of this invention and the examples thereof.

DEFINITION OF TERMS

The invention is concerned with the processes of preparing new hydrous halogenated interpolymers aqueous dispersions and in describing the process and products relating thereto and hereafter certain terms will be employed which will now be generally defined and hereafter set forth in more detail and also certain limits of the invention will be set out in defining these terms.

The term "hydrous halogenated isoolefin-multiolefin interpolymer" is set out in more detail hereinafter, however, this term is employed in a composite sense the individual terms thereof are defined hereafter and include the term "interpolymer," "isoolefin-multiolefin interpolymer" and "hydrous halogenated."

By the term "interpolymer" is meant the polymerization product produced when two or more monomers are polymerized together including when two or more different monomer molecules enter into the same polymer molecules, such interpolymers are also referred to as copolymers; and further by the term "interpolymer" is meant the polymerization product produced when two or more different monomers are polymerized sequentially or one or more monomers are polymerized in the presence of a polymer; as for example when natural rubber is swollen with methyl methacrylate and the latter polymerized therewith, then the resulting product is an "interpolymer" according to this definition and when the components of an interpolymer are inseparable from one another because the component polymers are chemically bonded to one another then the newly created interpolymer polymer is also referred to as a graft polymer. Thus according to this definition the hydrous halogenated isoolefin-multiolefin polymers are interpolymers.

By the term "isoolefin-multiolefin interpolymer" is meant those polymer compositions set forth under this heading hereinafter comprising polymerized $C_4$ to $C_8$ isoolefins in major proportion by weight and polymerized $C_4$ to $C_{18}$ multiolefins in minor proportion by weight with the preferred interpolymer being 70 to 99.5 percent by weight and the most preferred being at least 90 percent by weight or more polymerized $C_4$ to $C_8$ isoolefins and the remainder being polymerized multiolefin with or without other monomers.

By the term "butyl rubber" is meant those interpolymers of 99.5 percent by weight or more polymerized isobutylene and the remainder polymerized hydrocarbon conjugated diene e.g., isoprene.

By the term "hydrous halogenated" which term includes "partially hydrous halogenated" is meant the complete or partial hydrous halogenation or halohydrination in the presence of aqueous medium, of the residual unsaturation derived from the multiolefin content of the isoolefin-multiolefin interpolymer as for example hypochlorous acid or hypobromous acid or their mixture adds to the ethylenic unsaturation of the interpolymer forming the chlorohydrin or bromohydrin as follows:

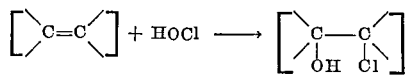

or

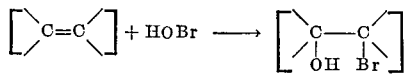

and thus such hydrous halogenated interpolymers include halogen groups and hydroxyl groups (halohydrin groups) such as chloro groups and hydroxyl groups (chlorohydrin groups) bromo groups and hydroxyl groups (bromohydrin groups) and mixed chloro and bromo groups and hydroxyl groups.

ISOOLEFIN-MULTIOLEFIN INTERPOLYMERS

The isoolefin-multiolefin interpolymers employed in this invention include not only those solid, plastic, rubbery interpolmers set forth in the above-listed patents under butyl rubbers heretofore but also those set forth in U.S. Patent No. 2,720,470; as for example interpolymers of a major proportion, desirably from 70 to 99% by weight, of an isoolefin containing from 4 to 8 carbon atoms such as isobutylene, 3-methyl butene-1, 4-methyl pentene-1, 2-ethyl butene-1, 4-ethyl pentene-1 or the like, or a mixture of such isoolefins and with a minor proportion, desirably from 1 to 30% by weight, of a multiolefin generally containing from 4 to 18 carbon atoms, or two or three or more such multiolefins including the following: (1) acyclic or open-chain conjugated diolefins such as butadiene-1,3, isoprene, 2,4-dimethyl butadiene-1,3, piperylene, 3-methyl pentadiene-1,3, hexadiene-2,4, 2-neopentyl butadiene-1,3, and the like; (2) the minor proportion of such interpolymer being a multiolefin containing from 4 to 18 carbon atoms with or without other monomers and including acyclic non-conjugated diolefins such as dimethallyl and its homologs containing 2 to 6 carbon atoms interposed between two isopropenyl radicals, 2-methyl hexadiene-1,5, 2-methyl pentadiene-1,4, 2-methyl heptadiene-1,6, 2-methyl heptadiene-1,4 and other tertiary non-conjugated diolefins having one double bond in the terminal position attached to a tertiary carbon atom; (3) alicyclic diolefins, both conjugated and non-conjugated, such as cyclo-pentadiene, cyclo-hexadiene, 1-vinyl cyclohexene-3, 1-vinyl cyclohexene-1, 1-vinyl cyclopentene-1, 1-vinyl cyclobutene-2, dicyclopentadiene, cyclooctadiene-1,5, dimethylcyclooctadiene-1,3, and the like as well as monocyclic diolefinic terpenes such as dipentene, terpinenes, terpinolene, phellandrines, sylvestrene and the like; (4) acyclic triolefins such as 2,6-dimethyl-4-methylene-heptadiene-2,5,2-methyl hexadiene-1,3,5 and other conjugated triolefins, as well as myrcene, ocimene, allo-ocimene and the like; (5) alicyclic triolefins such as fulvene, 6,6-dimethyl fulvene, 6,6-methyl ethyl fulvene, 6-ethyl fulvene, 6,6-diphenyl fulvene, 6-phenyl fulvene and other fulvenes wherein the 6 carbon hydrogens are substituted by alkyl, cycloalkyl or aryl; as well as other alicyclic triolefins such as 1,3,3-trimethyl - 6 - vinyl-cyclohexadiene-2,4, cyclododecatriene-1,5,9, cycloheptatriene, etc.; and (6) higher polyolefins such as 6,6-vinyl methyl fulvene (a tetraolefin) and 6,6-diisopropenyl fulvene (a pentaolefin).

The preferred solid, plastic, rubbery interpolymers are generally prepared by low temperature (from 0° C. to —200° C.) interpolymerization using an appropriate catalyst such as an active metal halide or Friedel-Crafts type catalyst (aluminum chloride or boron trifluoride) dissolved in a low freezing solvent such as methyl or ethyl chloride. These interpolymers generally have an average molecular weight about 15,000, iodine numbers of preferably from 0.5 to 50, and they are reactive with sulfur to form elastic products.

Isoolefin-multiolefin interpolymers containing other interpolymerized monomers such as styrene, chlorostyrenes, acrylyl chloride, methallyl chloride, and other monoolefinic monomers may also be used.

HYDROUS HALOGENATING AGENTS

The "hydrous halogenating agents" which may be employed in the hydrous halogenations according to the practice of this invention are the hypohalogenating agents such as hypochlorous and hypobromous acids, their esters (especially tertiary alkyl esters) and their salts such as their alkali metal salts, e.g., sodium hypochlorite or potassium hypochlorite (in aqueous solution).

The isoolefin-multiolefin interpolymers as defined herein are hydrous halogenated with the aid of the hydrous halogenating agents as just set out, the hydrous halogenation being conducted in the manner taught in the examples.

By the term "emulsifier" or "dispersant" is meant those cationic, non-ionic and in some instances anionic emulsifiers suitable for emulsifying solutions of the isoolefin-multiolefin interpolymers. Typical emulsifiers are given in the examples. It is important to keep the emulsifier concentration low and the examples have been so designed. About 10 percent by weight of emulsifier based on polymer content in practically all instances suffices and in most instances 5 or 6 or less percent by weight of emulsifier based on the polymer content is sufficient.

The cationic emulsifiers employed in the examples were dodecylamine acid salts such as the dodecylamine-glycolate, acrylate, methacrylate, etc., and likewise other primary, secondary, tertiary, and quaternary amine type emulsifiers may be employed, e.g., the alkyl polyoxyethylene amines and the like. Examples of cationic emulsifiers are to be found in the "Fourth Revision of Synthetic Detergents and Emulsifiers" by John W. McCutcheon published in Soap and Chemical Specialties, December 1957, January, February, March, April 1958.

Isoolefin-multiolefin interpolymers solutions are difficult to emulsify with non-ionic emulsifiers because of the strong hydrophobic character of the isoolefin-multiolefin interpolymers especially the isobutylene-isoprene interpolymers (butyl rubber). To be effective the HLB (hydrophile-lipophile balance) must be high and the chemical type must be correct for the isoolefin-multiolefin interpolymer. Emulsifiers for the purposes of this invention with high HLB value can be selected from among the alkyly polyoxyethylene ethers and alcohols, polyethylene ethers and alcohols, e.g., polyoxyethylene lauryl ethers, polyethylene lauryl alcohol, e.g., Brij–35 (a trademark product of Atlas Powder Co.); the polyethylated fatty alcohols, e.g., Emulphor ON or ON–870 (a trademark product of Antara Chemical Division of General Aniline & Film Corp.) and in some instances the alkyl aryl polyether alcohols and like non-ionic emulsifiers including combinations of such including with other types of non-ionic emulsifiers. Examples of the non-ionic emulsifiers of the types set forth are to be found in the "Fourth Revision of Synthetic Detergents and Emulsifiers" by John W. McCutcheon published in Soap and Chemical Specialties, December 1957, January, February, March, April 1958.

It should be noted that the water solubility and surface activity of non-ionic surface-active agents are dependent on the hydrophilic nature of the ether linkage and/or the hydroxyl groups in the non-ionic surface-active agent, rather than on ionization as in the case of the ionic (anionic and cationic) surface-active agents. The hydrogen bonding between the water and the ether linkage of such non-ionic surf-active agents decreases with temperature rise therefore emulsions of such with the polymer modified interpolymers of this invention should be stripped of diluent at low temperatures to prevent separation of the interpolymer from the aqueous dispersion. Thus aqueous dispersions prepared with non-ionic emulsifiers according to this invention can be employed where heat sensitive latex coatings are desired.

Combinations of non-ionic emulsifiers and cationic emulsifiers can be employed.

Anionic emulsifiers are useful in forming the emulsions of the isoolefin-multiolefin interpolymer which emulsion can be stabilized against the acid of the hydrous halogenation with the aid of non-ionic emulsifier material. The anionic emulsifiers in combination with non-ionic emulsifiers are employed in Example 9 and include the alkali soaps of disproportionated rosin acids (e.g., the potassium soap of said rosin acids). While the soaps of fatty acids are useful, especially when hydrogenated or saturated (as such do not rob the sulfur during curing); likewise ammonium casein solution is a useful emulsifier; and further hydrocarbon sulfonate emulsifiers and other organic sulfonate emulsifiers including the alcohol sulfonates as the alkali metal salts or ammonia or amine salts can also be employed, e.g., the sodium salt of butyl-α-naphthalene sulfonic acid or the sodium salt of naphthalene sulfonic acid likewise other sulfonates can be employed such as the dioctyl ester of sodium sulfosuccinic acid and sodium salt of alkyl aryl polyether sulfates and the like.

One skilled in the art after having been taught by the examples set forth herein, will realize that certain cationic and non-ionic emulsifiers suitable for the emulsification of heavy hydrocarbon oils or hydrocarbon polymers can likewise be employed to emulsify the solutions of the interpolymers of this invention.

By the term "diluent" or "solvent" is meant diluents and solvents suitable for dissolving or colloidally dispersing the isoolefin-multiolefin interpolymers. The solvents include methyl chloride, ethyl chloride, methylene chloride, chlorobenzene, chloroform, carbon tetrachloride, carbon disulfide, benzene, toluene, the xylenes, cyclohexane, methyl cyclohexane and in some instances non-aromatic hydrocarbon solvents, e.g., hexane, heptane and the like, and combinations of these solvents.

To increase the effectiveness of the emulsifier, especially when such emulsifiers are of the non-ionic or cationic types suitable water soluble organic solvents can be employed in limited amounts including those water soluble solvents having one or more of the following groups: hydroxyl, ether, carbonyl (including aldehyde and ketone), or combinations of these groups as for example, methyl, ethyl, or isopropyl alcohols, ethylene or propylene glycols, glycerin, hydroxyethyl ether, dioxane, methyl ethyl ketone, acetone, methyl Cellosolve, butyl Cellosolve, methyl carbitol and the like. These water soluble solvents are usually employed in amounts of more or less from 5–20% by weight based on the amount of solvent used to dissolve or disperse said isoolefin-multiolefin interpolymer. It is understood that the amount of water soluble solvent added must be less than the amount which will cause objectionable precipitation of said interpolymer from the solution of said interpolymer in the selected water immiscible solvent or from the aqueous dispersion.

Thus it is to be understood that the term "solvent" as employed herein and in the appended claims is meant to include not only the water immiscible solvents for the interpolymers of this invention, but also the combination of these water immiscible solvents with minor proportions of the water miscible (water soluble) solvents.

The amount of solvent preferably employed is usually about 7 to 10 times the weight of isoolefin-multiolefin interpolymer employed, with however, an emulsifiable viscosity being the limiting factor. While certain polar solvents including certain halogenated solvents and even certain petroleum solvents including aromatic solvents can be used, it has been the practice in the examples in most instances to employ benzene because of the ease of removal of benzene by volatilization.

The term "aqueous medium" means of course in water. It has been found that when the water employed is in amounts about equal to half the weight or less of the weight of solvent employed or an amount which will yield aqueous dispersions with an interpolymer content of about 10 to 30% by weight, then stable aqueous dispersions result; that is, the solvent (e.g., benzene) is removable without the formation of appreciable precoagulum. Further in many instances such aqueous dispersions can be further concentrated to high solids latices 40 to 60 percent by weight or more of polymer solids.

While in the examples reduced pressures are used to remove the volatile solvent it has been found that steam can be passed into the emulsions with or without vacuum to remove the aqueously non-miscible solvent.

CONCENTRATION OF AQUEOUS DISPERSIONS OF ISOOLEFIN-MULTIOLEFIN INTERPOLYMERS BEFORE OR AFTER HYDROUS HALOGENATION

The aqueous dispersions of interpolymers before or after hydrous halogenation can be concentrated in three principle manners: (a) latex concentration by water vapor removal and (b) latex concentration by creaming with aid of a creaming agent and separating the creamed layer, (c) creaming with the aid of electrolytes and reduction of temperature close to the freezing point, and either of processes (b) or (c) can sometimes be aided by centrifuging.

Aqueous dispersions of the interpolymers suitable for hydrous halogenation herein are readily prepared to 20–25 percent polymer solids (by weight) and by continuing the vacuum-heat stripping operation and after the solvent has been removed one can remove a part of the water and increase the solids to 25–35 percent polymer solids (by weight) and by this vacuum method one can obtain high solid latices of 50–60 percent polymer solids (by weight).

In some instances creaming agents employed for natural rubber latex can be used to cream the aqueous dispersions of this invention, however, because of the small particle size (most of the aqueous dispersions of this invention are filterable through shark skin type filter paper) often centrifuging is employed in combination to the addition of creaming agent to accomplish the creaming.

The creaming agents employable herein include the sodium, potassium or ammonium alginates, tragon seed gum, locust bean gum, konjaku flour, carraghee moss, agar-agar, pectin, gum tragacanth, karaya gum. Synthetic polyelectrolyte type polymers if the molecular weight is high enough such as sodium, potassium or ammonium polyacrylates or polymethacrylates, copolymers of maleic anhydride and vinyl monomers such as styrene and vinyl toluene etc., may in some instances be employed, however, the non-polyelectrolyte high molecular weight water soluble polymers are preferred. Especially suitable are the poly-vinyl alcohols and ethers, poly-ethylene oxides, methyl cellulose, ethyl cellulose, methoxycellulose, hydroxyethyl cellulose and like compounds. The amount of hydrophiic polymer creaming agent employed is from about 0.1 to 1.0 percent preferably about 0.3 percent by weight based on the water content of the dispersion being creamed. Most of the vegetable gums and non-ionic creaming agents are best prepared for use by allowing such to swell for several hours in sufficient cold water to make a 2 to 3% solution and then heating to 60° C. while stirring until a clear solution is obtained. An alkali in small amounts, e.g., ammonia, may be added to make the solution alkaline if such is to be employed with interpolymer aqueous dispersion prepared with an anionic emulsifier or even a small amount of acid added if such are employed with interpolymer aqueous dispersions prepared with cationic emulsifiers.

Dispersions prepared with cationic emulsifiers may be creamed with the natural occurring or synthetic non-ionic creaming agents as set out heretofore and in some instances may be creamed with a polyelectrolyte derived at least in part from basic polymerizable monomer material e.g., monomers having primary, secondary, or tertiary amine groups, as for example the vinyl pyridine polymers which can be dissolved in aqueous solution with the aid of an acid such as glycolic acid.

Creaming is usually aided by raising the temperature as aforesaid and/or adjustment of the latex pH e.g., with hydroxyethyl cellulose, however methyl cellulose gives better results when the latex is cold. The creamed products may separate satisfactorily after standing 12 to 48 hours otherwise centrifuging is employed and any suitable centrifuge such as the De Laval and Sharples machines may be employed.

COMPOUNDING OF AQUEOUS DISPERSIONS OF HYDROUS HALOGENATED INTERPOLYMERS

It is understood that the aqueous dispersions of the hydrous halogenated isoolefin-multiolefin interpolymers as set forth in this invention may be combined with other aqueous dispersions such at natural rubber latices and/or natural rubber latices modified by vinyl grafting, latices of derivatives of natural rubber, synthetic rubbers including conjugated diene-vinyl type synthetic rubbers e.g., butadiene-styrene copolymers, butadiene-acrylonitrile copolymers etc.; and/or resin latices derived from monomer material having at least a polymerizable carbon to carbon bond, e.g., the vinyl resin latices such as those prepared from styrene, the vinyl toluenes, the acrylate monomers, vinyl chloride, vinylidene chloride, the fluorine containing monomers, acrylonitrile etc.; and/or phenoplast aqueous dispersions or aqueous solutions and/or aminoplast aqueous dispersions or aqueous solutions and/or aqueous dispersions of $\alpha$-olefin polymers or copolymers e.g., polyethylene dispersions etc. and combinations of these.

The polymer dispersions of this invention with or without other vulcanizable latices may be latex compounded, as set forth herein, and vulcanized to produce new vulcanizates including vulcanized foam sponges.

The latices produced according to this invention are useful as latex dips for the coating of natural or synthetic fibres.

The latices produced by the present invention may also be employed for the making of latex-cast articles latex-foam articles, and for blending with other polymeric material or materials for producing polymer combinations of modified properties.

The latices of this invention, and combinations of those with other latices, before or after concentration, may be latex compounded for the production of vulcanizates therefrom, and the compounding ingredients employed may include colored pigments and the like when derived for decorative purposes.

When the aqueous dispersions of hydrous halogenated isoolefin-multiolefin interpolymers with or without combinations with other latices are to be vulcanized such aqueous dispersions are latex compounded and cured. The latex compounding ingredients may be of the following types (1) sulfur recipes with highly active accelerators suitable for curing butyl type elastomers including the tellurium accelerators; (2) the aminoplasts including halogenated aminoplasts and phenoplasts including halogenated phenoplasts and combinations of these; (3) halogenated polymers consisting of halogenated polymers from conjugated dienes, halogenated polymers from conjugated dienes and vinyl monomers and halogenated natural rubbers and combinations of these; (4) radiation curing employing the radiation from radioactive materials or other radiation sources capable of cross-linking polymers (such curing usually does not require the presence of vulcanization aiding materials) and combinations of these methods.

Particularly suitable for compounding the hydrous halogenated interpolymer hereof including the aqueous dispersions of such interpolymers are the aminoplasts including the halogenated aminoplasts or phenoplasts including halogenated phenoplasts and the halogenated unsaturated polymers.

The term "aminoplast" or "aminoplastic" is used in the same manner that C. P. Vale uses this term in his book entitled, "Aminoplastics," published in 1950 by Cleaner-Hume Press, Ltd., London, England. To form aminoplasts one can, for example, condense urea, melamine, thiourea or guanidine with an aldehyde such as formaldehyde or glyoxal and as catalyst either acid or alkaline condensation agents may be used. Thus 1 mole of urea may be condensed with two moles of formaldehyde with the aid of a small amount of acidic or alkaline condensing agents (U.S. Patent No. 1,355,834) forming the dimethylolurea and if this condensation is conducted in an alcohol solution etherification of the primary alcohol groups is promoted e.g., with butyl alcohol to produce the dimethylol dibutyl ether.

By the term "halo-aminoplasts" or "halogenated aminoplasts" is meant the amide-aldehyde condensates modified by etherification with a haloalcohol. Thus these halogenated aminoplasts include the urea, thiourea, toluene sulphonamide, ethylideneurea, melamine, guanidine and the like amides condensed (with or without the aid of a catalyst e.g., an acid or alkaline catalyst) with an aldehyde such as formaldehyde, paraformaldehyde, glyoxal, furfural, acrolein methacrolein, benzaldehyde, aldol and the like aldehyde and partially or completely ether etherified with a mono- or poly-halogenated, mono- or poly- hydric $C_2$ to $C_{22}$ alcohol including the partially or completely chlorinated, brominated, chloro-brominated or hydroxychlorinated or hydroxy-brominated unsaturated alcohols such as lauroleyl myristoleyl, palmitoleyl, oleyl, gadoleyl, erucyl, linoleyl, linelenyl, eleostearyl, ricinoleyl, arachidonyl, clupanodonyl undecanleyl alcohols, and including such halogenated products of other unsaturated $C_2$ to $C_{22}$ alcohols e.g., chloroethanol (chlorohydrin), bromoethanol (bromohydrin), the chloropropanols, the bromopropanols, the chlorobutanols, the bromobutanols, and $C_5$ to $C_{22}$ homologues of these and the $C_2$ to $C_{22}$ hydroxy-chloroethers and the $C_2$ to $C_{22}$ hydroxy-bromo-ethers. These halogenated aminoplasts provide reactive halogens curable with metal oxides, amines etc. as set forth herein and are thus employable with the interpolymers of this invention and such combinations are new, unique and useful.

When latex compounding the aminoplasts and haloaminoplasts such may be emulsified (with or without aqueous miscible or aqueous non-miscible solvent present) with the aid of an emulsifier such as employed for the interpolymers hereof.

The term "phenoplast" or "phenoplastic" is used in the same manner as used by T. X. Carswell in his book entitled, "Phenoplasts, Their Structure, Properties and Chemical Technology," published in 1947 by Interscience Publishers, Inc., New York, N.Y. To form a phenoplast a substituted phenol such as cresol, a xylenol or resorcinol is reacted with an aldehyde such as formaldehyde, paraformaldehyde, glyoxal, furfural and the like aldehydes with or without the aid of an acid or basic catalyst. Particularly suitable for use with the interpolymers and aqueous dispersion of interpolymers of this invention are the phenoplasts known as "resols" which are phenolaldehyde condensation products derived from phenol, hydrocarbon substituted phenols, bis-phenols, bis-phenol hydrocarbons, bis-(hydrocarbon substituted phenol) or bis-(hydrocarbon substituted phenol) hydrocarbons condensed with two molecules of aldehyde to form the corresponding dialcohols e.g., phenol dialcohol, bis-phenol-dialcohols etc. Thus phenol, p-cresol, p-ethylphenol, p-tert.-butyl phenol, p-tert.-amyl phenol, p-tert.-octyl phenol, p-tert.-nonyl phenol, p-phenyl phenol, p,p'-dihydroxy-diphenylmethane (bisphenol F), 4,4'-dihydroxy biphenyl, 4,4'-dihydroxy diphenyl dimethyl methane (bisphenol A), dihydroxy diphenyl sulfone and other long chain bisphenols and the like including in certain instances the ortho hydrocarbon substituted dihydroxy phenyls or the dihydroxy biphenyls which are formed by condensing such with two moles of aldehyde e.g., formaldehyde and these dimethylol derivatives are referred to herein as "resols." These dialcohols of these phenols or resols are usually formed by reacting two moles of reactive aldehyde and one mole of these phenols with the aid of an acid or even a strong alkaline catalyst in the temperature range of about 25 to 100° C.

The term "resol" as used in this invention and as set out heretofore and hereafter is used in the same sense as used in the treatise by H. W. Chatfield entitled "Varnish Constituents" published in 1953 by Leonard Hill Ltd., London, England. The author states on pages 295 and 296: "Oil-soluble (phenol-formaldehyde type) resins can be made either with acidic or basic catalyst."

Acid catalysed resins are sometimes described as novolaks or resites; alkali catalysed resins are known as resols. The novolaks have no free reactive methylol groups and remain permanently fusible on further heating. Further condensation can, however, be effected by the addition of hardening agents.

The resols contain free reaction methylol groups, and can be made to condense further, or harden by the simple application of heat, without the necessity of introducing hardening agents. The novolaks usually involve a slight molar excess of phenol, and the resols a slight molar excess of aldehyde.

Generally speaking the resols usually possess better alcohol solubility and the novolaks better hydrocarbon solubility.

Substituents in the benzene ring with hydrocarbon constituents in the ortho and para position is preferable to substituents in the meta position for oil solubility.

These resols, that is the biphenylalcohols or dialcohol phenols include for example the 4-hydrocarbon-2, 6-dimethylol phenol, bis 2-(4 hydrocarbon-6-methylol phenol) methane, bis 4-(2 hydrocarbon-6-methylol phenol) methane, and the like in which the hydrocarbon radical is an alkyl, isoalkyl, phenyl, alkyl phenyl, cycloalkyl alkyl cycloalkyl having a carbon range of 1 to 20 carbon atoms and preferably 3 to 20 carbon atoms. These dialcohols especially these dimethylols of phenol, hydrocarbon substituted phenols, biphenols and hydrocarbon substituted biphenols etc. are oil-soluble, heat reactive and self-condensing or self-curing. In combination with the aqueous dispersions of the interpolymers of this invention these dialcohols are employed while still aqueous alkali soluble or such may be heat treated and employed while still A-stage resins (resoles) referred to herein as "resols"or even the condensation may proceed until such are no longer aqueous alkali soluble even to the B-stage resins (resitol) referred to herein as "resols" provided such are dispersible in water with the aid of a water soluble organic solvent such as an alcohol e.g., ethanol or a ketone e.g., acetone or an ether, e.g., dioxane and/or the aid of an emulsifying agent.

The solvents employable in this invention to disperse the interpolymer hereof can include in addition to the water immiscible solvents set forth herein also in minor amount water miscible solvents having hydroxy, ether, aldehyde and ketone groups or combinations of these groups and these water soluble solvents can be employed to dissolve the "resols" and thus provide an easy manner of incorporating such resols with the interpolymers of this invention before or after such are dispersed in water with the aid of an emulsifying agent or before or after the water immiscible solvent is removed.

It is well known in the varnish trade that resols and resol esters react with unsaturated drying oils to make oil extended phenolic resins especially with the aid of basic catalyst such as basic oxides e.g., magnesium oxide, zinc oxide and the like, or with the aid of organic amines; or with the aid of organic acids or mineral acids or with the aid of acidic metal halides e.g., Friedel-Crafts catalysts such as tin dichloride, zinc chloride, ferric chloride and the like.

In employing the resols and resol esters in combination with the hydrous halogenated isoolefin-multiolefin interpolymers of this invention basic catalyst can be employed when non-ionic or anionic and non-ionic emulsifiers are used to prepare the aqueous interpolymer dispersions.

Aldehydes in the presence of alkali will react with ketones. Thus aldol condensation products of formaldehyde and acetone or other ketones like ethyl methyl ketone may be employed, for example, with resorcinol to form the resol employable with the hydrous halogenated interpolymer of this invention.

The resols heretofore described may be esterified by reacting with acetic anhydride or other acid anhydrides in known manner and the resol esters employed in place of the resols herein or combinations of resols and resol esters may be employed. The resol esters are used in the same amounts as the resols are employed with the interpolymers hereof.

The "resols" are employed in amounts of from 0.2 to 25% or preferably from 0.5 to 20% based on the weight of the hydrous halogenated interpolymer content of the aqueous dispersion.

By the term "halogenated phenolic resins or phenoplast" or "halo-phenolplast" is meant the phenolplast including the resols prepared from alkyl substituted phenols in which one or more hydrogens of the $C_1$ to $C_{14}$ alkyl group thereof is substituted for a halogen group particularly a chlorine and/or bromine group. Further discussion and examples of these halogenated phenolic resins is set out hereafter.

By the term "halogenated polymer" is meant the halogenated polymers from conjugated dienes, halogenated polymers from conjugated dienes and vinyl monomers and halogenated natural rubbers and these halogenated polymers are prepared from conjugated halo-dienes such as 2-chlorobutadiene-1,3, 2-bromobutadiene-1,3 and the like, e.g., the chloroprenes and further included under this term is meant the partially or completely halogenated unsaturated polymers including chloroprene, natural rubber, polybutadiene, conjugated diene-vinyl copolymers including butadiene-styrene, butadiene-vinyl toluene, butadiene-acrylonitrile, butadiene-acrylate copolymers and similar copolymers in which all or part of the butadiene is substituted by isoprene, piperylene and the like.

EXAMPLES

This invention teaches that aqueous dispersions of isoolefin-multiolefin interpolymers can be hydrous halogenated in the aqueous phase with a hydrous halogenating agent. Such hydrous halogenation is preferably carried out with interpolymer aqueous dispersions which are neutral or acidic in nature, however, when such are alkaline then precaution must be taken to prevent the hydrous halogenating agent from reacting with the aqueous alkali and destroying the emulsion of such interpolymer.

When cationic emulsifiers are used to prepare the isoolefins-multiolefin interpolymer aqueous dispersions and such are hydrous halogenated then hydrous halogenation proceeds with ease. Combinations of cationic and nonionic emulsifiers when employed as dispersant for the interpolymer likewise form aqueous dispersions which hydrous halogenate with ease. Aqueous dispersions of isoolefin-multiolefin interpolymers prepared with non-ionic emulsifier are suitable for aqueous hydrous halogenation. To aqueous dispersions of isoolefin-multiolefin interpolymers prepared with anionic emulsifiers can be added a non-ionic emulsifier and with or without acidifying same such may be aqueously hydrous halogenated.

The following examples teach the process of hydrous halogenation of isoolefin-multiolefin interpolymers according to this invention.

*Example 1.—Formation of isoolefin-multiolefin interpolymer, aqueous dispersion and hydrous halogenation thereof*

This example illustrates how butyl rubber may be converted to an aqueous dispersion and hydrous halogenated.

A mixture consisting of 1280 grams methyl chloride, 560 grams of isobutylene and 8.5 grams of isoprene is cooled to −150° F. (the preferred temperature range being −120° F. to −150° F.) and 4 grams of sublimed aluminum chloride dissolved in 400 grams of methyl chloride (Friedel-Crafts catalyst is employed in the range of 0.05 to 1.0% by weight based on the reactive hydrocarbons) is cooled to −150° F. and charged to the precooled reactant mixture at −150° F. in a precooled reactor at −150° F. and agitated with a propeller agitator. The polymer is formed almost instantaneously, separates from the methyl chloride and is dissolved in 5000 grams of benzene. To this combination of solvent and butyl rubber is added 1800 ml. of water and the amount of water employed can be varied to yield aqueous dispersions of interpolymer content of about 25% by weight with the limiting factor controlling the amount of water added being the viscosity of the emulsion when inversion taken place which viscosity in part depends on the molecular weight of the isoolefin-multiolefin interpolymer being emulsified, and the practical range for an aqueous dispersion of hydrous halogenated butyl rubber is between about 20 to 28% total solids; further an aqueous miscible solvent can be added to the aqueous phase hereof to the extent of 5 to 20% by weight based on the isoolefin-multiolefin interpolymer, e.g., in the present example 50 grams of ethanol (alternates are propylene glycol, glycerine, acetone, dioxane and the like), is added to the aqueous phase for the purpose of reducing the emulsifier requirements and to aid in yielding a stable latex and further adding 5.5 grams of dodecylamine and 34 grams of dodecylamine hydrochloride or alternatively 5.5 grams of dodecylamine and 40 grams of dodecylamine glycolate is added and the mixture emulsified. Thereafter is added the hydrous halogenating agent in the form of an aqueous solution containing 3 grams (preferred range 3 to 5 or less grams) of hypochlorous acid or alternately an aqueous solution containing 5 grams (preferred range 5 to 11.5 grams) of hypobromous acid.

*Examples 2–6.—Concentration of aqueous dispersions of the hydrous halogenated interpolymer*

The aqueous dispersions of the hydrous halogenated interpolymers hereof, e.g., as prepared in the Example 1 and in the examples hereafter, may be concentrated to high solid latices by three steps as follows: step (1) the solvent is vacuum stripped from the aqueous dispersion of the hydrous halogenated interpolymer and the resulting latex is further concentrated by vacuum water stripping while heating the latex to about 60–95° C. that is, until the latex dry solids has reached 25–35% (this partially removal of water assures that the last traces of solvent are also removed) and then if desired water is further removed until the desired solids are obtained; step (2) a creaming agent solution is prepared dissolving in water about 2–5% preferably about 3% of water soluble polymer to yield a highly viscous solution (suitable creaming agents are those hydrophilic polymers giving the highest viscosity aqueous solution with the least polymer). The creaming agent solution is combined with the aqueous dispersion of hydrous halogenated interpolymer (20 to 30% by weight solids) hereof employing about 0.2 to 2.0% and preferably about 0.3% creaming agent. The creaming agent solution and the aqueous dispersion of hydrous halogenated interpolymer hereof are then intimately mixed (the pH is adjusted if desirable) and the mixture aged about 8 to 48 hours preferably about 12 hours. This aging process permits the creaming agent (the hydrophilic polymer) to diffuse into the aqueous medium of the interpolymer aqueous dispersion thereby concentrating such. In some cases aging alone, with aid of some heat if necessary, will cause creaming, however, it may be necessary to resort to the aid of centrifuging step (3) hereof. When the proper creaming agent is chosen the creamed product will be a latex of about 40–60% dry solids or more.

Table I teaches methods of concentrating the hydrous halogenated isoolefin-multiolefin interpolymer aqueous dispersions hereof. In Examples 2–6 of Table I the latex employed was the hydrous chlorinated butyl latex of Example 1, and alternately in these Examples 2 to 6 one can employ the hydrous butyl latex.

TABLE I.—PREPARATION OF HIGH SOLIDS LATICES BY CREAMING AQUEOUS DISPERSION OF HYDROUS HALOGENATED INTERPOLYMER

| Example | 2 | 3 | 4 | 5 | 6 |
|---|---|---|---|---|---|
| Creaming Agent—Hydrophilic Polymer: | | | | | |
| Polyacrylamide,[1] g | 0.2 | | | | |
| Polyethylene oxide,[2] g | 0 | 0.2 | | | |
| Tragacanth gum, g | | | 0.2 | | |
| Methoxycellulose,[3] g | | | | 0.2 | |
| Polyethylene oxide,[4] g | | | | | 0.2 |
| Water, ml | 7 | 7 | 7 | 7 | 10 |
| Time for solution, hrs | 12 | 12 | 12 | 12 | 12 |
| Hydrous Halogenated Polymer Latex: | | | | | |
| Latex type from Example | 1 | 1 | 1 | 1 | 1 |
| Amount (latex) ml | 100 | 100 | 100 | 100 | 100 |
| Intimately mixed | X | X | X | X | X |
| Aged, hrs | 12 | 12 | 12 | 12 | 12 |
| Centrifuged | X | X | X | | |
| Creamed Latex: Dry solids, percent wt | ←——40 to 65——→ | | | | |

[1] Polyacrylamide 200 produced by American Cyanamide Co.
[2] Carbopol 934 produced by Union Carbide Corp.
[3] Cellosize WP-4400 produced by Union Carbide Corp.
[4] Polyox WSR-301 produced by Union Carbide Corp.

While these examples teach the concentration is conducted after the aqueous hydrous halogenation of the isoolefin-multiolefin interpolymer such concentration of the aqueous interpolymer dispersion may be conducted before the hydrous halogenation step and said hydrous halogenation conducted on the concentrated latex and said hydrous halogenation carried out as described herein for the non-concentrated latices of the interpolymers concerned in this invention.

*Example 7.—Aqueous hydrous halogenation of isoolefin-multiolefin interpolymer aqueous dispersion prepared with cationic emulsifier*

To 180 grams of benzene was added 20 grams of butyl rubber (GR-1-17) cut into small pieces and permitted to dissolve and the solution was pressure filtered (10% solids). In a high speed mixer was added 2 grams of dodecylamine followed by 1 gram of glycolic acid (70% purity) and 100 grams of water. The high speed blendor while rapidly mixing also heated the mixture to 69° C. and part of the benzene evaporated the remainder was removed by subsequent heating to 100° C. The resulting reddish translucent latex filtered easily through shark skin filter paper.

Chlorine gas diluted with air was allowed to pass slowly into 100 grams of the above prepared butyl latex cooled to 50° C. or lower until 0.2 gram of chloride as hypochlorous acid had been taken up. The resulting product was an aqueous dispersion of hydrous chlorinated butyl rubber. Efficient agitation is essential to accelerate the halohydrin reaction and to avoid local concentration of chlorine which would cause chlorination of the butyl latex rather than hypochlorination. The dilute chlorine must be added slowly to the latex as the actual proportion of hyochlorous acid and hydrochloric acid are very small; however, the velocity of addition of hypochlorous acid is very fast compared with the addition of chlorine to the butyl latex. When using a halogen gas it is often advantageous to add a small excess of the dodecylamine or another more soluble amine in order to remove the hydrochloric acid and maintain the equilibrium favoring the hypochlorous acid.

*Example 8.—Butyl rubber latex prepared with cationic emulsifier and hydrous halogenation*

To 4 bottles was added a total of 75 grams of butyl rubber (Polysar Butyl XPRD-759 containing non-staining antioxidant and produced by Polymer Corp. Ltd.) and 700 ml. of benzene and the bottles were capped and rotated in a water bath at 60° C. overnight. The resulting solution was placed in a high speed blendor (Waring Blendor) and was added 7.5 grams of dodecylamine (Armeen 12D a trademark product of the Armour and Co.) and 3.75 grams of glycolic acid (70% purity) followed by 375 ml. of water and the mixture was emulsified by agitating at high speed for 10 minutes. The emulsion was placed in a flask heated in a water bath at 70° C. and with the aid of vacuum the solvent benzene was stripped off yielding a stable aqueous dispersion of the butyl rubber.

While agitating the butyl rubber latex an aqueous solution of hypobromous acid is slowly added and the butyl rubber latex is hypobromated. The aqueous solution of hypobromous acid is prepared by dissolving 2 grams of bromine in 100 ml. of ice water and then adding thereto 1.33 grams of sodium carbonate dissolved in 20 ml. of water.

*Example 9.—Hydrous halogenation of an aqueous dispersion of isoolefin-multiolefin interpolymer prepared with both anionic and non-ionic dispersing agent*

To 1110 grams of a benzene solution containing 100 grams of butyl rubber (Polysar XPRD-759 containing non-staining antioxidant and produced by Polymer Corp. Ltd.) placed in a high speed mixer of the Waring type was added 30 grams of 12.5% aqueous solution of the potassium soap of coconut oil fatty acids, 450 ml. of water and 20 ml. of ethanol and this combination emulsified. The emulsion was placed in a flask heated in water bath at 60° C. and benzene removed by vacuum stripped. A stable latex resulted with 21.1% total solids.

To 614.5 grams of the above isobutylene-isoprene (butyl rubber) aqueous dispersion was added 50 grams of a 10% solution of a non-ionic emulsifier polyoxyethylene lauryl alcohol (Brij 35 a trade product of the Atlas Powder Co.) after mixing in the emulsifier the pH of the aqueous dispersion was adjusted to 6 with 10% acetic acid and cooled to 5° C. in an ice bath.

The hypobromous acid solution is prepared in a manner similar to that described in Example 8 hereof in which 2 grams of bromine are dissolved in 100 ml. of ice water to which is added 1.33 gram of sodium carbonate dissolved in 20 ml. of water.

While agitating the butyl latex the hypromous acid solution is slowly added. A stable aqueous dispersion of hydrous brominated butyl rubber resulted. In place of the bromine one can employ chlorine. In place of the coconut oil fatty acid soap employed herein other anionic emulsifiers can be employed including those employed in copending U.S. application No. 12,685, filed March 4, 1960 by Oliver W. Burke, Jr., Oscar M. Grace and René G. Jennen entitled "Aqueous Dispersion of Interpolymer Material and Uses Thereof," which procedures are herein included by reference.

*Example 10.—Hydrous halogenation of an aqueous dispersion of isoolefin-multiolefin interpolymer prepared with non-ionic emulsifier*

To 155 grams of a 12.9% butyl rubber (Polysar XPRD-759) in benzene in a high speed mixer (Waring type) was added 2 grams of non-ionic emulsifier polyoxyethylene lauryl alcohol (Brij 35 a trademark product of the Atlas Powder Co.) and 75 ml. of water, the combination was agitated for 10 minutes to form the emulsion. The emulsion was placed in a flask and stripped of benzene with the aid of vacuum. While some coagulum formed during stripping a stable latex of 11.3% total solids was thus prepared.

While agitating the butyl rubber emulsion there was added dropwise at equally slow rates (a) a solution of 0.3 gram of chlorine dissolved in 25 ml. of ice water and (b) a solution of 0.15 gram of sodium carbonate dissolved in 25 ml. of water and the butyl rubber latex was hypochlorinated.

VULCANIZATION RECIPES

The new aqueous dispersions of hydrous halogenated interpolymers hereof can be latex compounded by recipes set forth in Tables II and III hereafter. For aqueous compounding of the aqueous dispersions hereof the compounding ingredients are prepared as aqueous dispersion by grinding with the aid of a dispersing agent (5 percent or less dispersing agent based on dry weight of material being dispersed) such as the polymerized sodium salt of alkyl naphthalene sulfonic acid, isooctyl phenyl polyethoxy ethanol, dioctyl ester of sodium sulfosuccinic acid, alkyl aryl sulfonate and other dispersing agents suitable for dispersing compounding ingredients for latex compounding.

The resols employed in Table III are described in more detail in Table IV hereafter. One skilled in the art of compounding will realize that numerous variations can be made including substitutions of other curing ingredients.

TABLE II.—COMPOUNDING RECIPES

| Example | 11 | 12 | 13 | 14 | 15 | 16 | 17 | 18 |
|---|---|---|---|---|---|---|---|---|
| Aqueously Dispersed Compounding Ingredients (dry solids basis per 100 grams of Hydrous Halogenated Interpolymer): | | | | | | | | |
| Zinc oxide, g | 5 | 5 | 5 | 4 | 5 | 5 | ------ | 5 |
| Mercaptobenzothiazole, g | 0.5 | ------ | 0.5 | 0.5 | 1.0 | ------ | ------ | ------ |
| Tetraethylthiuram disulfide, g | 1.5 | 1.0 | 2 | 0.5 | ------ | ------ | ------ | 1.0 |
| Sulfur, g | 2 | 2.2 | 2 | 2 | ------ | 2.2 | 2 | 2.2 |
| Lead dioxide, g | ------ | ------ | ------ | ------ | ------ | ------ | 5 | ------ |
| Quinone dioxime, g | ------ | ------ | ------ | ------ | ------ | ------ | 1.5 | ------ |
| Benzothiazyl disulfide, g | ------ | ------ | ------ | ------ | ------ | ------ | 4 | ------ |
| Magnesium oxide, g | ------ | ------ | ------ | 2 | ------ | ------ | ------ | ------ |
| Cumar resin, g | ------ | ------ | ------ | 5 | ------ | ------ | ------ | ------ |
| Tellurium diethyl dithiocarbamate, g | ------ | 0.5 | ------ | ------ | ------ | 1.5 | ------ | 0.5 |
| Diethyl triamine, g | ------ | ------ | ------ | ------ | ------ | ------ | 2 | ------ |

TABLE III.—COMPOUNDING RECIPES

| Example | 19 | 20 | 21 | 22 | 23 | 24 | 25 | 26 |
|---|---|---|---|---|---|---|---|---|
| Phenolic Resin (see Table IV) Type | A | B | C | D | E | F | G | G |
| Resol, g | 8 | 10 | 6 | 12 | 18 | 6 | 3 | 2 |
| Aqueous Dispersed Compounding Ingredients (dry solids basis per 100 grams of Hydrogenated Interpolymer): | | | | | | | | |
| Benzothiazyl disulfide, g | 1 | 1 | 1 | 0.5 | ------ | ------ | ------ | 0.5 |
| Tellurium diethyl diethiocarbamate, g | 1 | 1 | 1 | ------ | ------ | ------ | ------ | ------ |
| Sulfur, g | 1.5 | 1.5 | 1.5 | ------ | 1 | 1 | 2 | ------ |
| Zinc oxide, g | 5 | ------ | ------ | 5 | 5 | 4 | 4 | 7.5 |
| Stannous chloride, g | ------ | 2 | ------ | ------ | ------ | ------ | ------ | ------ |
| Zinc chloride, g | ------ | ------ | 2 | ------ | ------ | ------ | ------ | ------ |
| Diethylene triamine, g | ------ | ------ | ------ | 4 | ------ | ------ | ------ | ------ |
| Formaldehyde, g | ------ | ------ | ------ | ------ | ------ | ------ | ------ | ------ |
| 2-Mercaptobenzothiazole, g | ------ | ------ | ------ | 0.5 | 0.5 | 0.5 | 1 | ------ |
| Tetraethylene thiuram disulfide, g | ------ | ------ | ------ | ------ | ------ | ------ | 1.5 | ------ |
| Magnesium oxide, g | ------ | ------ | ------ | 0.4 | 0.4 | 0.4 | ------ | ------ |
| Tetraethyl thiuram monosulfide, g | ------ | ------ | ------ | 2 | 2 | 2 | ------ | ------ |
| | ------ | ------ | ------ | ------ | 0.25 | ------ | ------ | 0.25 |

TABLE IV.—RESOL COMPOSITION

| Resol III | A | B | C | D | E | F | G |
|---|---|---|---|---|---|---|---|
| Phenol (moles): | | | | | | | |
| Bisphenol A | 1 | ------ | ------ | ------ | ------ | ------ | ------ |
| Bisphenol F | ------ | 1 | ------ | ------ | ------ | ------ | ------ |
| 4,4'-dihydroxy biphenyl | ------ | ------ | 1 | ------ | ------ | ------ | ------ |
| p-Tert.-phenyl phenol | ------ | ------ | ------ | 1 | ------ | ------ | ------ |
| p-Tert.-nonyl phenol | ------ | ------ | ------ | ------ | 1 | ------ | ------ |
| p-Tert.-octyl phenol | ------ | ------ | ------ | ------ | ------ | 1 | ------ |
| p-Tert.-butyl phenol | ------ | ------ | ------ | ------ | ------ | ------ | 1 |
| Aldehydr (moles): Formaldehyde | 2.1 | 2.1 | 2.3 | 2.3 | 2.2 | 2.3 | 2.1 |
| Alkali (moles): Sodium hydroxide | 2 | 2 | 2 | 1 | 1 | 1 | 1 |
| Reaction Temperature | ←—————50–75° C.—————→ | | | | | | |
| Neutralize | X | X | X | X | X | X | X |
| Solvent (moles): | | | | | | | |
| Acetone | ------ | ------ | 5 | ------ | ------ | ------ | ------ |
| Ethanol | ------ | ------ | ------ | 8 | ------ | ------ | ------ |
| Methyl ethyl ketone | ------ | ------ | ------ | ------ | 6 | ------ | ------ |
| Dioxane | ------ | ------ | ------ | ------ | ------ | ------ | 5 |

In place of the phenolic resins (resols) employed in Examples 19 through 26 Table III heretofore other alkylated phenol-formaldehyde resins in stage A or stage B may be employed including the primary and secondary as well as the tertiary $C_1$ through $C_{14}$ alkylated phenol-aldehyde resins including the aldehyde resins from alkylated phenols, alkylated with propylene, propylene dimer, propylene trimer, isobutylene, isobutylene dimer and isobutylene trimer and the like: which includes the resols of these $C_1$ to $C_{14}$ alkylated phenols and the like; further included are the aldehyde resins, e.g., formaldehyde resins of $C_1$ to $C_{14}$ alkylated phenols in which one or more hydrogens of the alkyl groups are substituted by a halogen group including fluoro, chloro, bromo or iodo groups preferably with the chloro or bromo group or combinatins of these groups and this especially includes the chloromethyl and/or bromoethyl alkylated phenols in which the alkyl group contains $C_1$ to $C_{14}$ carbons and including the resols thereof. For example the aldehyde resins, especially the formaldehyde resins from p-(chloro-isobutyl) phenols, p-(bromo-isobutyl) phenols, p-(chloro-diisobutyl) phenols, p-(bromo-diisobutyl phenols and homologues of these. Like the phenolic resins the halogenated phenolic resins may be employed in this invention in the A stage or in the B stage.

Thus the halogenated phenolic resins especially the chlorinated and/or brominated phenolic resins provide halogen groups which can aid in the curing of the hydrous halogenated isoolefin-multiolefin interpolymer aqueous dispersions of this invention.

In place of the phenolic resins (resols) employed in Examples 19 through 26 of Table III heretofore one may employ in about the same quantities as set forth in the examples of aminoplasts as for example the condensation products of one mole of urea and two moles of formaldehyde modified to improve solubility in hydrocarbons by introduction of a suitable aliphatic alcohol into the urea-formaldehyde product and the alcohols which are suitable for this purpose include butyl, isobutyl, amyl, octyl, nonyl, capryl, decyl, tridecyl and higher alcohols. Similar products prepared from thiourea can likewise be employed together with the aldehyde and alcohols.

In place of the phenolic resin (resols) employed in Examples 19 through 26 of Table III heretofore one may employ in about the same quantities as set forth in the examples a halogenated aminoplast, as for example, the condensation product of one mole of urea with two moles of formaldehyde modified by introduction of a suitable haloaliphatic alcohol into the urea-formaldehyde product and the halo-alcohols which suitable for this purpose include 1-chloropentanol-5, 1-bromopentanol-5, 1-chloro-octanol-8, 1-bromooctanol-8, 1-chlorononylol-9, 1-bromononylol-9, 1-chlorodecylol-10, 1-bromodecylol-10, other halogenated isomers of these $C_8$ to $C_{22}$ alcohols and including dichlorostearyl alcohol, dibromostearyl alcohol, dichloro capryl alcohol, chloro-bromo capryl alchol, di-cholro-caprylyl alcohol, chloro-bromo-caprylyl alcohol, dibromo-caprylyl alcohol, dichloro-caproyl alcohol, chloro-bromo caproyl alcohol, dibromocaproyl alcohol and like halogenated alcohols.

In Table III Examples 19 to 26 in place of the phenolic resins employed one may employ a halogenated or partially halogenated (especially a chlorinated and/or brominated with or without other halogen groups including fluoro and chloro groups) unsaturated polymer, especially a homo or multipolymer derived at least in part from a conjugated diene such as butadiene, isoprene, dimethyl butodiene, piperylene or other $C_4$ to $C_8$ conjugated diene. Thus the partially or completely chlorinated, brominated, chloro-brominated with or without other halogen groups, unsaturated polymers that may be included are halogenated natural rubber, polybutadiene, butadiene-vinyl copolymers, especially the butadiene-styrene, the butadiene-vinyl toluene, the butadiene-acrylonitrile, butadiene-acrylate monomer copolymers similar polymers in which all or part of the butadiene is substituted by isoprene, piperylene and the like, including the chloro-butadiene polymers. When halogenating these unsaturated polymer latices, especially natural rubber latex it may be necessary to add an emulsifier or additional emulsifier and the non-ionic emulsifiers suitable for stabilizing polymer emulsions are particularly useful.

When employing these halogenated polymer latices including chloroprene and bromoprene latex per se it is preferable to employ a metal oxide e.g., zinc oxide and/or magnesium oxide in amounts from 5 to 10 parts per 100 parts of interpolymer material and/or one may employ an amine e.g., diethylene triamine or triethylene pentamine, monoethanolamine, diethanolamine, triethanolamine and the like. These halogenated unsaturated polymers may also be employed in combination with the phenolic resins including halogenated phenolic resins and/or the aminoplasts including the halogenated aminoplasts.

Thus the aqueous dispersions of hydrous halogenated isoolefin-multiolefin interpolymer of this invention with or without other vulcanizable latices may be latex compounded, as set forth herein, and vulcanized to produce vulcanizates including vulcanized films, sponges and the like.

While there have been described herein what are at present considered preferred embodiments of the invention it will be obvious to those skilled in the art that minor modifications and changes may be made without departing from the essence of the invention. It is therefore understood that the exemplary embodiments are illustrative and not restrictive to the invention, the scope of which is defined in the appended claims, and that all modifications that come within the meaning and range of equivalents of the claims are intended to be included therein.

We claim:

1. A process for the preparation of a modified aqueous polymer dispersion consisting essentially of at least partially hydrous halogenating an interpolymer composition, in aqueous dispersion essentially free of organic solvent, with the aid of a hydrous halogenating agent selected from the class consisting of hypochlorous acid, hypobromous acid, and the esters and metal salts of such acids, said interpolymer composition comprising polymerized $C_4$ to $C_8$ isoolefin in major proportion and polymerized $C_4$ to $C_{18}$ multiolefin in minor proportion, and said hydrous halogenating agent providing said interpolymer with hydroxyl groups and halogen groups selected from the class consisting of chloro-groups, bromo-groups and combinations of such groups.

2. A process for the preparation of a modified aqueous polymer dispersion consisting essentially of preparing an aqueous dispersion of an interpolymer composition by emulsifying an organic solvent solution of an interpolymer in aqueous medium with the aid of an emulsifying agent and then removing essentially all of the organic solvent, said interpolymer comprising polymerized $C_4$ to $C_8$ isoolefin in major proportion and polymerized $C_4$ to $C_{18}$ multiolefin in minor proportion, and then at least in part hydrous halogenating said interpolymer aqueous dispersion with the aid of a hydrous halogenating agent selected from the class consisting of hypochlorous acid, hypobromous acid, and the esters and metal salts of such acids, said hydrous halogenating agent providing said interpolymer with hydroxyl groups and halogen groups selected from the class consisting of chloro-groups, bromo-groups and combinations of such groups.

3. A process for the preparation of a modified aqueous polymer dispersion consisting essentially of preparing an aqueous dispersion of interpolymer composition by emulsifying an organic solvent solution of an interpolymer composition and aqueously immiscible diluent in aqeous medium with the aid of an emulsifying agent, and removing essentially all of the aqueous immiscible diluent from the resulting emulsion, said interpolymer composition comprising polymerized $C_4$ to $C_8$ isoolefin in major proportion and polymerized $C_4$ to $C_{18}$ multiolefin in minor proportion; and at least in part hydrous halogenating said interpolymer aqueous dispersion with the aid of a hydrous halogenating agent selected from the class consisting of hypochlorous acid, hypobromous acid, and the esters and metal salts of such acids, said hydrous haolgenating agent providing said interpolymer with hydroxyl groups and haolgen groups selected from the class consisting of chloro-groups, bromo-groups and combinations of such groups.

4. A process for the preparation of a modified aqueous polymer dispersion consisting essentially of polymerizing a $C_4$ to $C_8$ isoolefin in major proportion and a $C_4$ to $C_{18}$ multiolefin in minor proportion together with a water immiscible diluent and with the aid of a Friedel-Crafts catalyst at temperatures below —100° F. and after polymerization has taken place adjusting the said interpolymer solids content to within the range of 8–25 percent by weight by adjusting the content of solvent and then raising the temperature, then adding water in an amount ranging from 2⅓ to 9 times the weight of said interpolymer, emulsifying the resulting mixture with the aid of an emulsifier selected from the class consisting of cationic emulsifiers, non-ionic emulsifiers and combinations thereof, said emulsifier being employed in the range of 3% to 12% by weight of said interpolymer, then removing essentially all of the water immiscible diluent, and then at least in part hydrous halogenating said interpolymer aqueous dispersion with the aid of a hydrous halogenating agent selected from the class consisting of hypochlorous acid, hypobromous acid, and the esters and metal salts of such acids, said hydrous halogenating agent providing said interpolymer with hydroxyl groups and halogen groups selected from the class consisting of chloro-groups, and combinations of such groups.

5. An aqueous dispersion composition consisting essentially of a hydrous halogenated interpolymer composition in aqueous dispersion, said interpolymer thereof comprising polymerized $C_4$ to $C_8$ isoolefin in major proportion and polymerized $C_4$ to $C_{18}$ multiolefin in minor proportion, and having halohydrin groups with the halogen groups of such halohydrin groups selected from the class consisting of chloro-groups, bromo-groups and combinations of such groups; together with an aqueous dispersion of a vulcanization aiding material selected from the class of vulcanization aids consisting of halogenated phenoplasts, halogen-free phenoplasts, halogenated aminoplasts, halogen-free aminoplasts, halogenated conjugated-diene polymerizates, halogenated conjugated-diene/vinyl interpolymers, halogenated natural rubber and combinations of the foregoing.

6. A hydrous halogenated interpolymer composition in aqueous dispersion, said interpolymer thereof consisting essentially of polymerized $C_4$ to $C_8$ isoolefin in major proportion and polymerized $C_4$ to $C_{18}$ multiolefin in minor proportion, and having halohydrin groups and the halogen groups of the halohydrin groups of said interpolymer being selected from the class of halogen groups consisting of chloro-groups, bromo-groups and combination of such groups.

7. A hydrous halogenated interpolymer composition in aqueous dispersion according to claim 6 in which the total solids content exceed fifty percent by weight of said aqueous dispersion.

8. A vulcanizable composition comprising a hydrous halogenated interpolymer composition according to claim 6 and a vulcanizing agent therefore.

9. The vulcanizate of the product of claim 8.

References Cited by the Examiner
UNITED STATES PATENTS

| | | |
|---|---|---|
| 2,586,124 | 2/1952 | Van Amerongen ____ 260—29.7 |
| 2,883,351 | 4/1959 | Uraneck et al. _____ 260—29.7 |
| 2,943,664 | 7/1960 | Baldwin et al. _____ 260—29.7 |
| 2,965,620 | 12/1960 | Serniuk et al. _____ 260—85.3 |
| 3,085,074 | 4/1963 | Burke et al. _____ 260—29.7 |

MURRAY TILLMAN, *Primary Examiner.*

D. J. BREZNER, *Assistant Examiner.*